Apr. 24, 1923.
F. T. COURT
1,453,130
DISTANT CONTROL FOR TRACTORS
Filed May 12, 1922
2 Sheets-Sheet 1
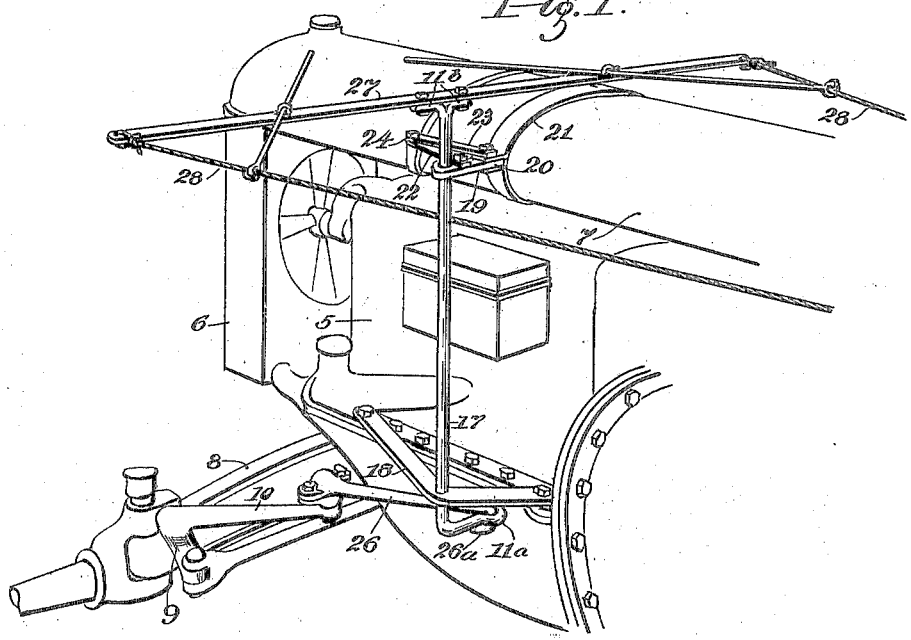
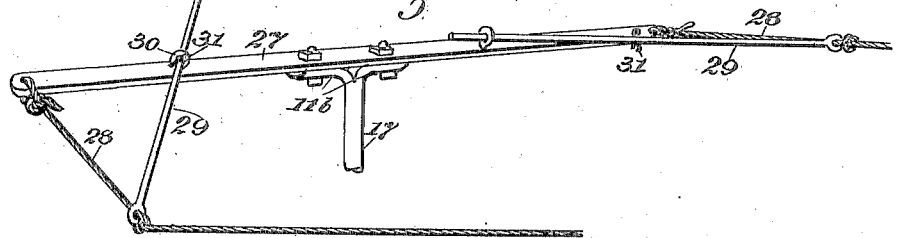
Inventor
Frank T. Court
By J. M. St. John
Atty.

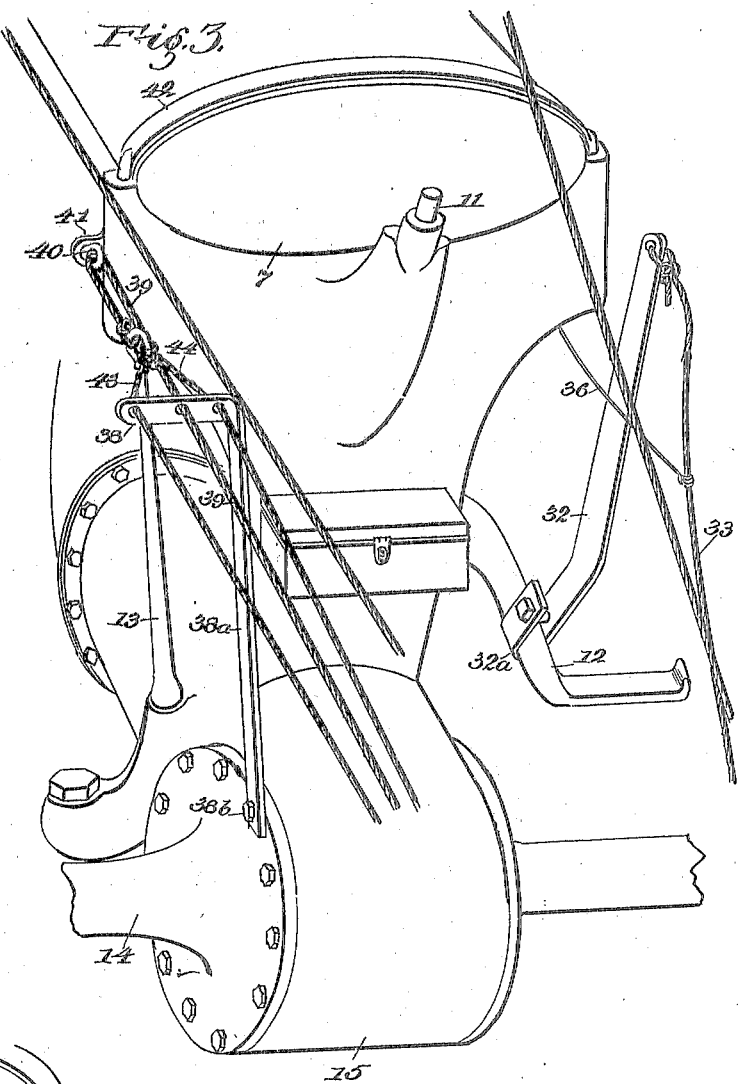
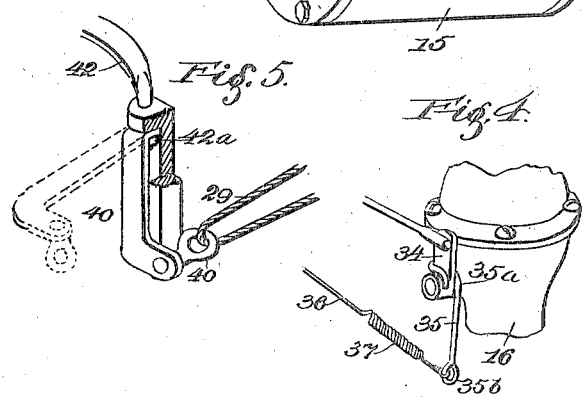

Patented Apr. 24, 1923.

1,453,130

UNITED STATES PATENT OFFICE.

FRANK T. COURT, OF WALKER, IOWA.

DISTANT CONTROL FOR TRACTORS.

Application filed May 12, 1922. Serial No. 560,508.

*To all whom it may concern:*

Be it known that I, FRANK T. COURT, a citizen of the United States, residing at Walker, in the county of Linn and State of Iowa, have invented certain new and useful Improvements in Distant Controls for Tractors; and I do hereby declare the following to be a full, clear, and exact description of the invention, such as will enable others skilled in the art to which it appertains to make and use the same.

This invention relates to tractors, and the object of the invention is to provide simple and convenient means for controlling them at a distance, as from a vehicle or machine at the rear.

In the operating of tractors, more particularly on a farm, it is desirable in many cases to sit or stand on the machine or implement drawn by the tractor (a harvester, for example), so as to be able to manage the machine itself, and drive the tractor from that position thus dispensing with an extra man on the tractor. This is rendered easy and practicable by means of the apparatus hereafter to be described.

The invention is fully disclosed in the description and claims following, reference being had to the accompanying drawings, in which:

Fig. 1 is a view in perspective of steering apparatus embodying my invention, as seen from the rear, a portion of the front half of the tractor being shown conventionally. Fig. 2 is a similar view of the steering lever and its connections detached. Fig. 3 is a view in perspective, from a like point of view, of apparatus for shifting gears of a tractor, to control the speed, part of the rear end of the tractor being shown conventionally. The view also shows means for operating the clutch and steering gear, and for controlling the action of the governor. Fig. 4 shows a governor conventionally, and the attached controlling device. Fig. 5 shows in detail the mounting of a pull-ring by means of which the gear-shift lever is drawn forwardly.

The invention is illustrated as applied to a tractor of a familiar type, and well known as the "Fordson." In this the engine is indicated by the numeral 5, the radiator by 6, and an overhead tank for fuel (kerosene) by the number 7. To the front axle 8 is connected the usual steering-gear 9, an arm 10 of which ordinarily connects by a long rod, not shown, with actuating apparatus connecting with the steering-shaft 11 (Fig. 3). A part of this connecting-rod is made use of in my apparatus, as will be explained presently. The tractor is provided with a clutch-releasing lever 12, normally operable by the foot, and with a gear-shift lever 13 terminating at the upper end in a ring. The rear axle of the tractor is supposed to be mounted in the tubular extensions or housings 14 secured to each side of the transmission gear-case 15. The governor 16, when one is used, is usually mounted near the front end of the tractor at the right side, not shown in the pricipal figures, but shown detached and fragmentarily in Fig. 4.

To operate a tractor, after the engine is started, the operator must be able to release the clutch, shift gears, control the steering mechanism, and usually regulate the throttle in some manner. When the tractor is provided with a governor, this throttle control is mainly automatic, but it is still desirable to be able to control the governor itself, especially to slow down the tractor in passing through gates, or in making turns at the end of a field. All of these controls are made possible by my apparatus at any desired distance from the tractor, which may be driven as easily as a horse, and in much the same manner.

Referring now to Fig. 1, it will be seen that two bearings are attached to the tractor at one side, to carry a cranked steering-shaft 17. One of the bearings, 18, is bolted to the engine crank-case by two of its own bolts. The other bearing 19 is bolted at 20 between the ends of a band 21 encircling the fuel-tank. The bearing is rigidly braced by a pair of braces 22 and 23, bolted to it, and to the tractor at 24, an original bolt being used at that point. The crank of the steering-shaft has an eye formed at 11ª, and in this is hooked a short connecting-rod 26, which may be formed from the original long connecting-rod above referred to, by cutting it off and bending a hook at 26ª. The upper end of the shaft is split, and to the outwardly bent arms 11ᵇ is bolted a double-ended lever 27. To holes in the ends of this lever are attached ropes 28, which may extend rearwardly to any desired distance, and by means of which the steering-gear is controlled.

The pull on this steering-lever will sometimes be almost in line with the lever, as shown in Fig. 2. This is effective as to the end nearer the operator, but to reverse the direction at this acute angle would be difficult, or impossible, as the pull would be from the farther end of the lever and almost in line with it. Provision is accordingly made for securing proper leverage on this farther end of the lever, regardless of its angle to the operator. The device consists of a pair of slide-rods 29, which may slide freely in pivoted eyes 30 attached to the lever, when the pull is outward from the steering-shaft, the ropes being tied in eyes at the ends of the rods, as shown. When the pull is inward, or toward the shaft, however, the movement of the rod is arrested by a pin 31, and the rod projects backwardly from the lever and serves as a strut, whereby the rope is carried out from the end of the lever, giving adequate leverage, as will be evident.

The controlling device for the clutch-lever is very simple, consisting of an upstanding lever 32, which may be clipped to the foot-lever at its looped end 32$^a$. A hole at its upper end receives a pull-rope 33, whereby the clutch may be released.

When the clutch is released it is not necessary for the governor to be in action. The clutch pull-rope may therefore be used as a medium for manipulating the governor. To the governor lever 34 is attached an auxiliary lever 35, looped at 35$^a$ to provide a simple attachment, and provided with a terminal eye 35$^b$. To this eye is connected a pull-wire 36, with an interposed coil spring 37, and the other end of the wire connects with slack in the rope 33. A pull on the rope will thus actuate the governor before any action on the clutch-lever takes place. The spring 37 compensates for the extra pull to release the clutch.

The gear-shift lever is actuated by three ropes or cords running through holes in a guide-plate 38 secured by its supporting standard 38$^a$ to the transmission gear-case by a bolt 38$^b$, one of the original bolts being used. The middle rope 39 is attached to the shift-lever ring, and thence is looped through an eye 40 forming part of a bracket 41 attached to the rear support of the fuel tank. The rope returns backwardly through the middle guide-hole. The bracket is best made of bendable material, pierced at the upper end to receive the threaded shank of the band 42 which binds the front end of the fuel tank in position. After the nut 42$^a$ is screwed up tightly, the bracket is bent down to final position, as shown in Fig. 5.

The gear-shift lever is assumed to be in the neutral position as shown in Fig. 3. Converging ropes 43 and 44 connect with the shift-lever ring, and pass backwardly through the lateral guide-holes. By holding the middle rope and pulling on either of the others the lever is shifted sidewise. Pulling on either rope alone will then draw the lever back. Conversely, a pull on the rope 39 will pull the lever forward. By a simple manipulation of the three ropes it is thus possible to shift the lever to its five cardinal positions, which in the case of this tractor are: central for neutral; left forward for reverse; left rear for low; right forward for intermediate, and right rear for high.

In operating the controls all of the six ropes should be easily accessible, but need not all be grasped simultaneously under all circumstances. Ordinarily the steering ropes may be picked up after the tractor has been started and given its proper speed by the use of the other ropes. Thereupon, such other ropes may be hung, close at hand, and only the steering ropes be held. But of course all must be accessible for instant use, if the tractor is driven at all from a station more or less remote from the tractor itself.

Having thus described my invention, I claim:

1. Tractor control apparatus operable from a distance, comprising, in combination with the front axle steering-gear, a cranked upright shaft, bearing therefor, a link connecting its crank with the steering-gear, a right-and-left cross-lever attached to the shaft, pull-ropes attached to the arms of the lever, and strut-rods connecting with said ropes some distance from the arms, the struts being slidably connected with the lever arms, but limited in their inward movement, whereby leverage may always be had on the farther arm, while the nearer one may be practically in line with its pull-rope.

2. Tractor control apparatus operable from a distance, comprising, in combination with the front axle steering-gear, a cranked upright shaft, a link connecting its crank with the steering-gear, a double-armed operating lever connecting with the shaft, pull-ropes therefor, and upper and lower bearings for the shaft, the upper one being held by a band encircling the tractor fuel-tank and auxiliary braces, and the lower one being bolted to the engine of the tractor, substantially as shown and described.

In testimony whereof I affix my signature in presence of two witnesses.

FRANK T. COURT.

Witnesses:
CHAS. H. TEMEYER,
WM. M. WILEY, Jr.